US 6,728,306 B1

(12) United States Patent
Shi

(10) Patent No.: US 6,728,306 B1
(45) Date of Patent: Apr. 27, 2004

(54) METHOD AND APPARATUS FOR SYNCHRONIZING A DS-CDMA RECEIVER

(75) Inventor: Qicai Shi, Tamarac, FL (US)

(73) Assignee: Motorola, Inc., Schaumburg, IL (US)

(*) Notice: Subject to any disclaimer, the term of this patent is extended or adjusted under 35 U.S.C. 154(b) by 655 days.

(21) Appl. No.: 09/716,837

(22) Filed: Nov. 20, 2000

(51) Int. Cl.[7] ................................ H04B 1/69
(52) U.S. Cl. .................. 375/149; 375/130; 370/342
(58) Field of Search ................. 375/149, 130, 375/147, 150; 370/335, 342

(56) References Cited

U.S. PATENT DOCUMENTS 4,217,586 A * 8/1980 McGuffin ............... 343/100
4,972,480 A * 11/1990 Rosen .................. 455/26.1
5,729,570 A * 3/1998 Magill .................. 375/130

* cited by examiner

Primary Examiner—Temesghen Ghebretinsae

(57) ABSTRACT

A system for synchronizing a DS-CDMA receiver (106) to a received signal (700) using actual data as opposed to a special training sequence is provided. A chip by chip multiplication (910, 1304) is applied to a sequence of received chip complex values in order to eliminate most traces of bit sign information from the received signal (700). The foregoing allows multiple bit length sequences of chips extracted from actual data to be combined, e.g., averaged, in order to reduce random noise. A low noise vector which has been derived from actual data can then be used to synchronize (1312) the receiver (106) to a desired degree of precision.

52 Claims, 10 Drawing Sheets

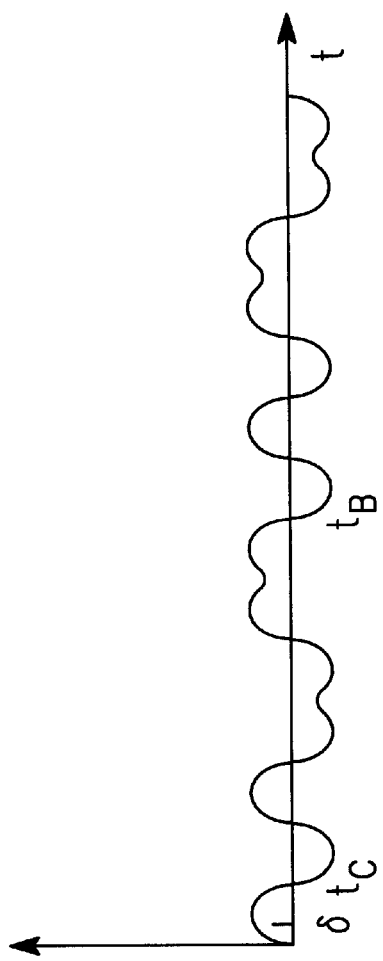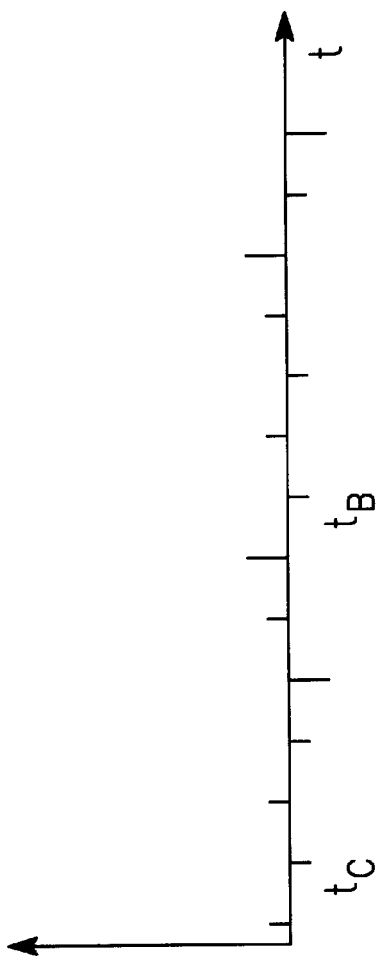

METHOD AND APPARATUS FOR SYNCHRONIZING A DS-CDMA RECEIVER

FIELD OF THE INVENTION

This invention pertains to Direct Sequence Code Division Multiple Access (DS-CDMA) technology. More particularly this invention pertains to a DS-CDMA receiver and method for synchronizing the DS-CDMA receiver, and a communication system in which the DS-CDMA receiver is used.

BACKGROUND OF THE INVENTION

Direct Sequence Code Division Multiple Access (DS-CDMA) has emerged as the preeminent method for sharing a spectrum allocation among a plurality of communication channels, e.g., a plurality of wireless devices using a wireless network cell. DS-CDMA has been proven in practice to offer higher data rates for a given bandwidth allocation than competing systems, e.g., Time Division Multiple Access (TDMA) or frequency hopping spread spectrum.

DS-CDMA is also a type of spread spectrum signaling method. As opposed to frequency hopping spread spectrum techniques, a DS-CDMA signal uses an entire allocated bandwidth at any given instant.

In the DS-CDMA signaling method a binary data sequence, which is biased so that two equal signal states correspond to equal and opposite sign signal levels, is multiplied by a DS-CDMA code which is biased in the same manner, but is characterized by a much higher frequency. For example, every bit cycle of the binary data sequence typically corresponds to from 7 to 127 signal periods of the DS-CDMA code. The signal periods of the DS-CDMA code are referred to as chips. The DS-CDMA code can comprise a pseudo random number sequence or a Walsh code. The DS-CDMA code is repeatedly multiplied by successive bits of the binary data sequence. Each communication channel has a unique DS-CDMA code for the purpose of discrimination. The product of the data sequence and the DS-CDMA code can be used to modulate a carrier frequency in a binary phase shift key (BPSK) modulator to produce an RF signal for transmission.

At a receiver a RF to baseband demodulator is used to demodulate the received RF signal. An output of the RF to baseband demodulator is filtered by a low pass filter to produce a filtered signal. The filtered signal comprises the aforementioned product also know as a baseband signal plus noise and interference. A bit demodulator then multiplies the baseband signal by a locally stored copy of the DS-CDMA code. If in performing the multiplication, the locally stored DS-CDMA code is properly temporally aligned with the received baseband signal, then the two instances of the DS-CDMA code (the one by which the data sequence is multiplied in the transmitter, and the one by which the demodulated base band signal is multiplied in the receiver) will multiply out to unity leaving the original binary data sequence.

A challenge in DS-CDMA technology is the proper temporal alignment of the locally stored DS-CDMA code with the DS-CDMA code in the received baseband signal.

One prior art approach is to transmit a predefined training signal based on a sequence of DS-CDMA codes that are not multiplied by a binary data sequence. After RF-to baseband demodulation, and filtering successive bit length (DS-CDMA code sequence length) vectors are extracted from the baseband signal by sampling it with an analog to digital converter. The corresponding chip complex values in the vectors are averaged to produce an average vector. The averaging operation serves to reduce random noise. A cross correlation calculation is then performed at various relative shifts (the relative shifts can be cyclical shifts of the vector. In a cyclical shift each element is advanced by one position and the last element is moved to the first element positions or vice versa depending on the direction of the shift) between the average vector and the DS-CDMA code sequence which is stored in the receiver in order to determine a correct shift between the received signal and the DS-CDMA code stored in memory (in a predetermined shift state). The correct shift information can then be used to properly synchronize the receiver with the baseband signal, e.g., by shifting by the correct shift points in the baseband signal at which the successive chip complex values of the DS-CDMA code are multiplied.

According to another technique, rather than sending a signal based on a sequence of DS-CDMA codes that are not multiplied by a binary data sequence, a signal is sent which is based on multiplying the DS-CDMA code by a training sequence which is also stored in the receiver. In the receiver the DS-CDMA code is multiplied by successive bits in the training sequence, and the process continues in similar fashion to the process discussed in the foregoing paragraph.

Both of these methods for synchronizing a DS-CDMA receiver to a received baseband signal suffer from the drawback that a training period during which data cannot be transmitted is necessitated. This diminishes an average data rate at which the receiver can receive information.

The problem of synchronizing a DS-CDMA receiver to baseband signal is exacerbated by the fact that DS-CDMA signals are spread over a large bandwidth and are close to the noise floor of communication systems in which they are used.

Noise problems can be overcome to an extent by averaging over more bit length vectors during the synchronization. However, to do so would require extending the training period to receive more bit length vectors. Extending the training time would further diminish the average data rate.

DS-CDMA receivers utilize an oscillator, usually a crystal based oscillator to generate a master clock signal. The master clock signal is used after dividing down, for clocking the sampling times of the analog to digital converter and timing the multiplication of the baseband signal by the DS-CDMA code in the bit demodulator. The master clock signal is also used to generate a local oscillator signal used in the RF to baseband demodulator. Low cost oscillators can cause errors in the master clock signal and signals derived therefrom. Additionally environmental factors such as Doppler fading can also lead to discrepancies between the frequencies of signals derived from the master clock signal and frequencies of the received signal (e.g., carrier frequency, bit rate). It would be desirable to use lower cost oscillators (e.g., based on lower cost crystals), but to do so would necessitate more frequent synchronization training periods which would further reduce the average data rate.

In the interest of conserving a receiver's battery power, it would be desirable to only obtain 1 sample per chip, however to do so would be detrimental to a signal to noise ratio, unless the sample timing is aligned near a center (peak) of a chip pulse shape function of the baseband signal. If a lower cost oscillator is used, unless the receiver is frequently synchronized, which would result in a lower data rate in the case of the prior art methods mentioned above, the sample timing will drift off alignment causing a reduction in the signal to noise ratio, and perforce data errors.

Presently, the cost of crystal oscillators presents a cost reduction barrier for wireless communication devices.

What is needed is a system and method for maintaining the synchronization of a DS-CDMA receiver, without compromising the average data rate.

What is needed is a system and method for maintaining the synchronization of a DS-CDMA receiver having a low precision oscillator without compromising the data rate.

What is needed is a system and method for maintaining the synchronization of a DS-CDMA receiver operating in a noisy environment without compromising the data rate.

BRIEF DESCRIPTION OF THE FIGURES

The features of the invention believed to be novel are set forth in the claims. The invention itself, however, may be best understood by reference to the following detailed description of certain exemplary embodiments of the invention, taken in conjunction with the accompanying drawings in which:

FIG. 10 is a graph showing a post filter version of the DS-CDMA code sequence signal shown in FIG. 6.

FIG. 11 is a time series showing a sequence of samples of the post filter version of the DS-CDMA code sequence shown in FIG. 10.

DETAILED DESCRIPTION OF THE PREFERRED EMBODIMENTS

Figure 1:
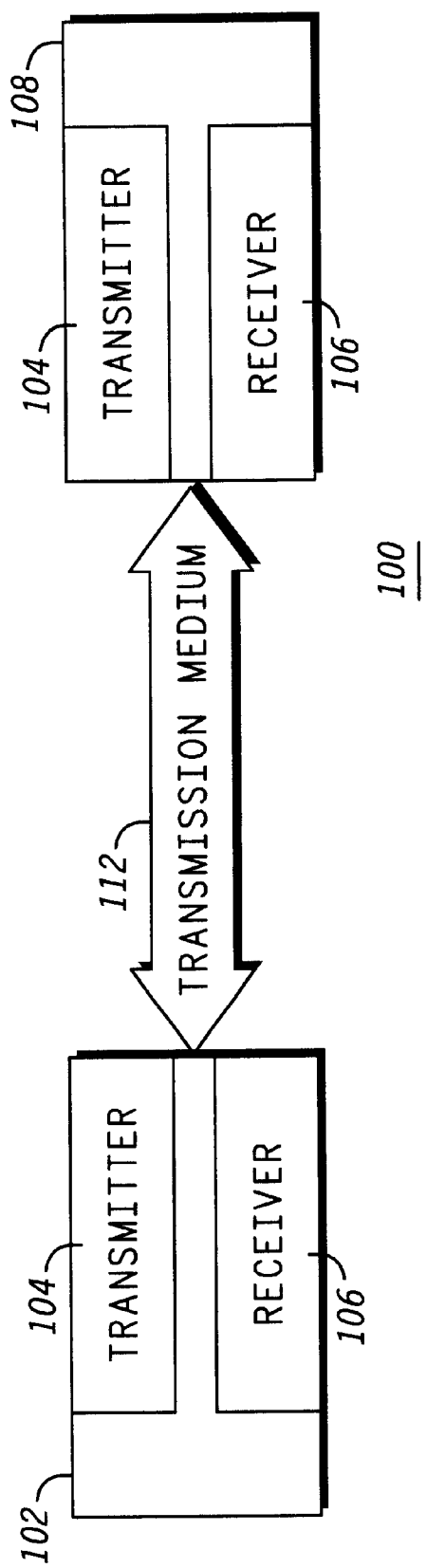
FIG. 1 is a schematic of a communication system according to a preferred embodiment of the present invention.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

According to preferred embodiments of the present invention, a method, apparatus, and software for a communication system for synchronizing a DS-CDMA receiver to a received signal using the non predetermined signal received in the course of ordinary data transmission (as opposed to a predetermined training sequence) is provided. The system allows synchronization to be performed frequently and on the basis of long sequences of chips without reducing the average data rate at which the receiver can receive data. Therefore less expensive receiver oscillators which necessitate more frequent synchronization of the receiver can be employed.

FIG. 1 is a schematic of an exemplary communication system 100 used according to a preferred embodiment of the invention. This communication system 100 is representative of many different types of communications systems that may utilize the present invention.

A first communication apparatus 102, which can for example take the form of a cellular phone, comprises a first transmitter 104, and a first receiver 106.

A second communication apparatus 108, such as a cellular system base station comprises a second transmitter 104, and a second receiver 106.

A transmission medium 112 couples the first communication apparatus, and the second communication apparatus.

Figure 2:
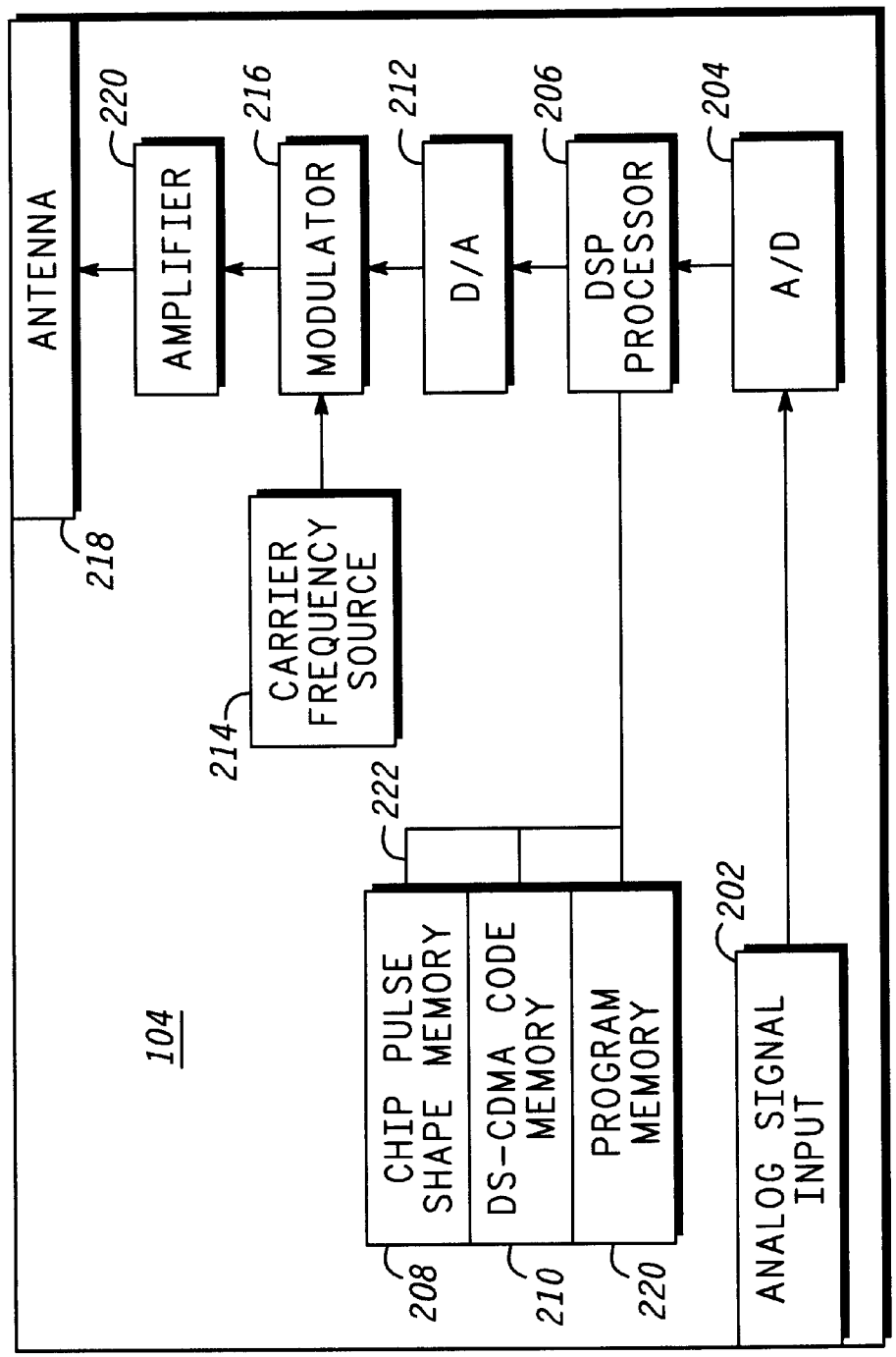
FIG. 2 is a hardware block diagram of a transmitter shown in FIG. 1 according to a preferred embodiment of the present invention.

Referring to FIG. 2 an exemplary hardware block diagram of a transmitter 104 is shown.

The transmitter 104 comprises an analog signal input 202, which can for example receive a signal from a microphone or a CCD camera.

The analog input 202 is coupled to a transmitter analog to digital converter 204, which converts an analog signal received from the analog signal input into a digital signal.

The transmitter analog to digital converter 204 is coupled to a digital signal processor 206.

A program memory 220, DS-CDMA code memory 210, and chip pulse shape memory 208 are coupled to the DSP processor through a signal bus 222. The three foregoing memories 208, 210, 220 can be implemented, for example, as a single physical memory, e.g., a flash memory.

The program memory 220 is a computer readable medium which stores software, the functioning of which will be discussed with reference to flow chart 300 (FIG. 3) below.

The DS-CDMA code memory 210 stores a DS-CDMA code. The chip pulse memory stores a digital representation of a pulse shape. The pulse shape is designed, in consideration of regulatory bandwidth usage restrictions to have a limited frequency bandwidth.

An output of the digital signal processor 206 is coupled to an input of a digital to analog converter 212. The digital signal processor 206 combines the representation of the chip pulse shape, the DS-CDMA code, and a binary data sequence read from the transmitter analog to digital converter 204 into a digital representation of the baseband signal. The digital representation drives the digital to analog converter 212 to output an analog version of the baseband signal.

A modulator 216 has a first input coupled to an output of the digital to analog converter 212, and receives the analog version of the baseband signal therefrom. The modulator 216 has a second input coupled to an output of a carrier frequency source 214, and receives a carrier frequency signal therefrom. The modulator 216 serves to modulate the carrier frequency signal with the analog version of the baseband signal, and output a resulting radio frequency (RF). Preferably Binary Phase Shift Key modulation is used. Other types of modulation can also used be used, including but not limited to Quadrature Phase Shift Key QPSK and Offset Quadrature Phase Shift Key (OQPSK).

An amplifier 220 comprises an input coupled to an output of modulator 216 for receiving the RF signal.

An antenna 218 comprises an input coupled to an output of the amplifier 220 for receiving the RF signal. The antenna 218 serves to couple the RF signal into the transmission medium 112 which, in one preferred embodiment, can comprise free space.

In the case that the transmitter 104 is part of a wireless network node, the analog data input 202 would be replaced by an input for receiving a binary data sequence from another receiver (not shown).

Figure 3:
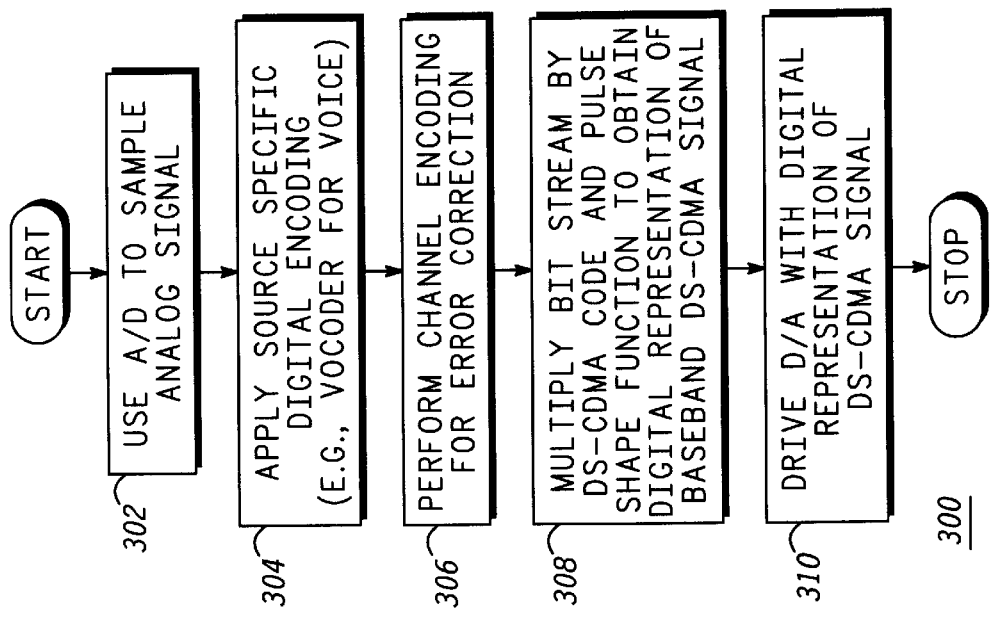
FIG. 3 is a flow diagram of a process performed by the transmitter shown in FIG. 2 according to a preferred embodiment of the invention.

FIG. 3 is a flow chart of a process 300 performed by the transmitter 104 (FIG. 1, FIG. 2) according to a preferred embodiment of the invention.

In process block 302 the transmitter analog to digital converter 204 (FIG. 2) is used to sample the analog signal from the analog signal input 202 (FIG. 2)

In process block 304 source specific digital encoding is applied to a signal output by the transmitter analog to digital converter 204. In the case of a voice signal the source specific encoding can comprise encoding using a vocoder algorithm. In the case image data the source specific encoding can comprise Moving Pictures Expert Group (MPEG) encoding.

In process block 306 channel encoding for the purpose of error correction is applied to a data structure generated in process block 304. The channel encoding can comprise linear block encoding, or circularly redundant check coding, for example.

In process block 308 each bit in a binary data sequence generated in process block 304 is multiplied by a DS-CDMA code comprising a plurality of chips, and each of the plurality of chips is multiplied by a pulse shape function, to produce the digital representation of the base band signal.

In process block 310 the digital to analog converter 212 is driven with the digital representation of the baseband signal.

Multiplication of the pulse shape function, DS-CDMA code and binary data stream are illustrated with reference to FIGS. 4–7.

Figure 4:
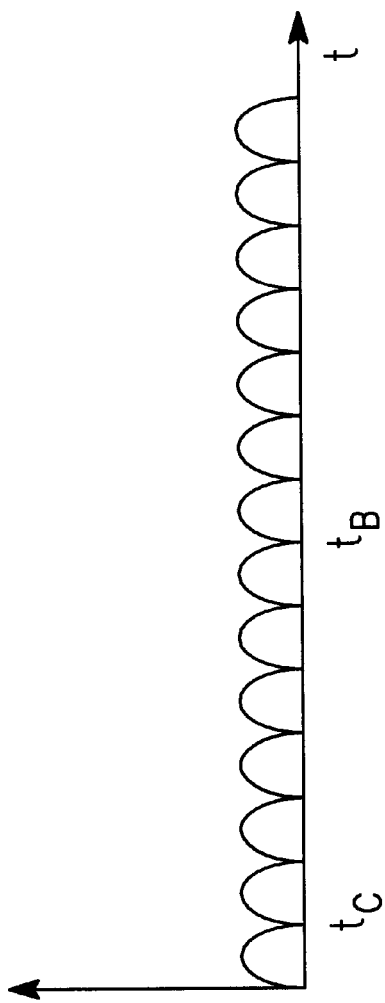
FIG. 4 is graph showing a sequence of chip pulse shape functions.

FIG. 4 shows a graph of a sequence of chip pulse shape functions spaced along a t axis, at intervals of a chip period Tc. There are seven chip pulse shape functions between t=0 on the t axis and t=Tb, where Tb is a bit time. Although shown here as a continuous function over a continuous domain the pulse shape function would actually be stored as a set of discrete points in the chip pulse shape memory 208 (FIG. 2)

Figure 5:
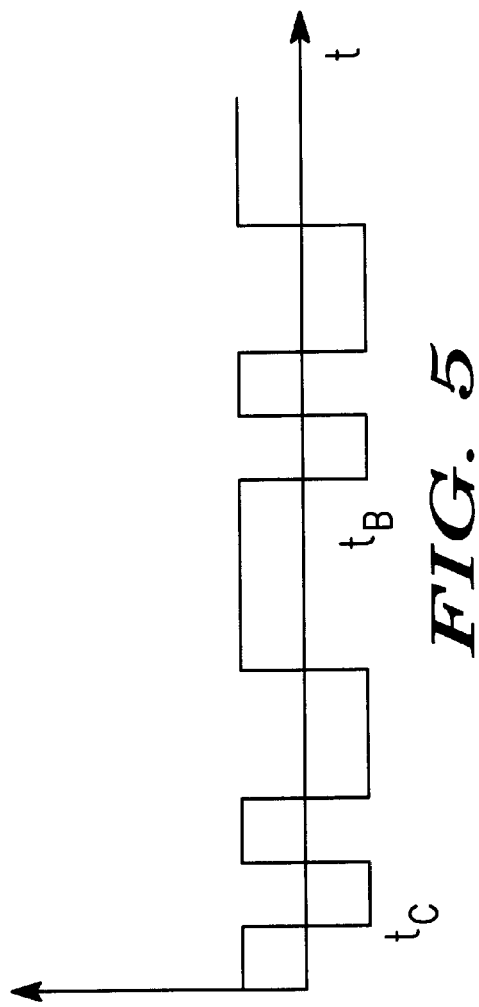
FIG. 5 is a graph showing a DS-CDMA code sequence in signal form.

FIG. 5 shows two sequential DS-CDMA code sequence signals. Note that the signal is binary taking on only two equal, but opposite sign values (e.g., −1, 1). The point of demarcation between the two DS-CDMA code sequence signals is at Tb on the t axis.

Figure 6:
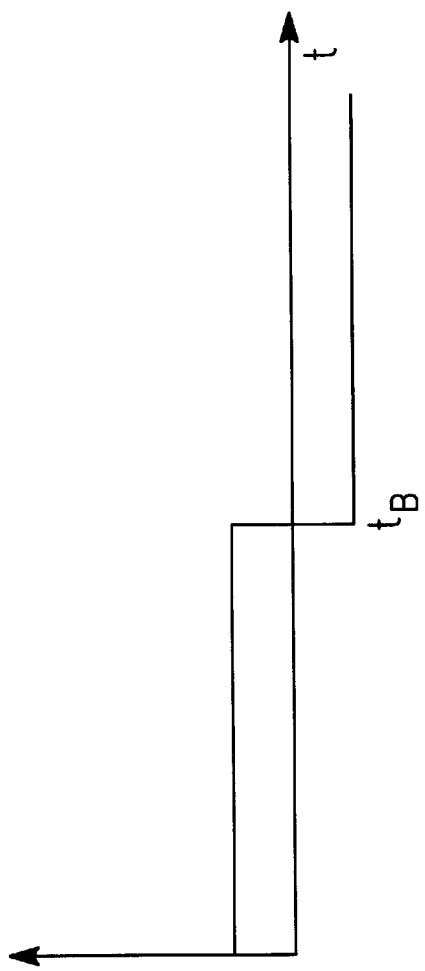
FIG. 6 is a graph showing a binary data sequence in signal form.

FIG. 6 shows a two bit binary data sequence that starts with a positive sign data bit and ends with a negative sign data bit. Note that normal binary numbers comprising zeros and ones can be converted to a bipolar binary sequence by substituting a negative one for each zero.

Figure 7:
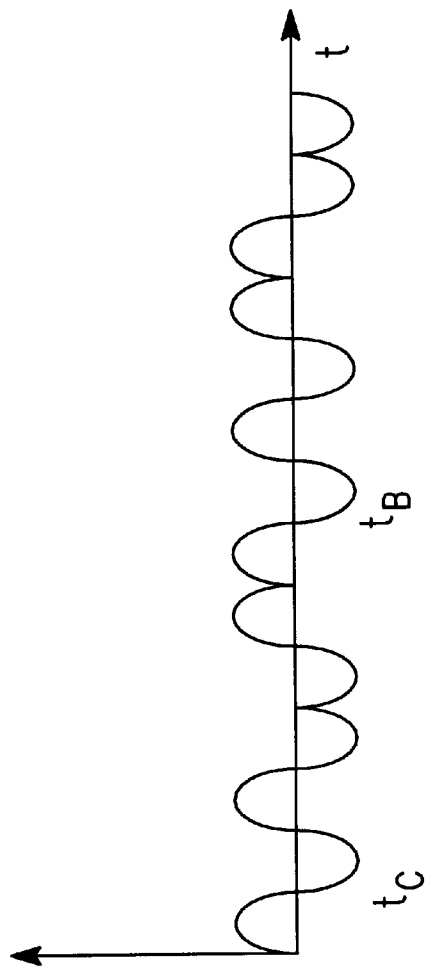
FIG. 7 is a graph showing an analog version of a baseband DS-CDMA signal derived from the signals and functions shown in FIGS. 4–6.

FIG. 7 shows the analog version of the baseband signal 700 which is obtained by multiplying together the pulse shape functions shown in FIG. 4, the DS-CDMA code sequence signals shown in FIG. 5, and the binary data sequence shown in FIG. 6.

Figure 8:
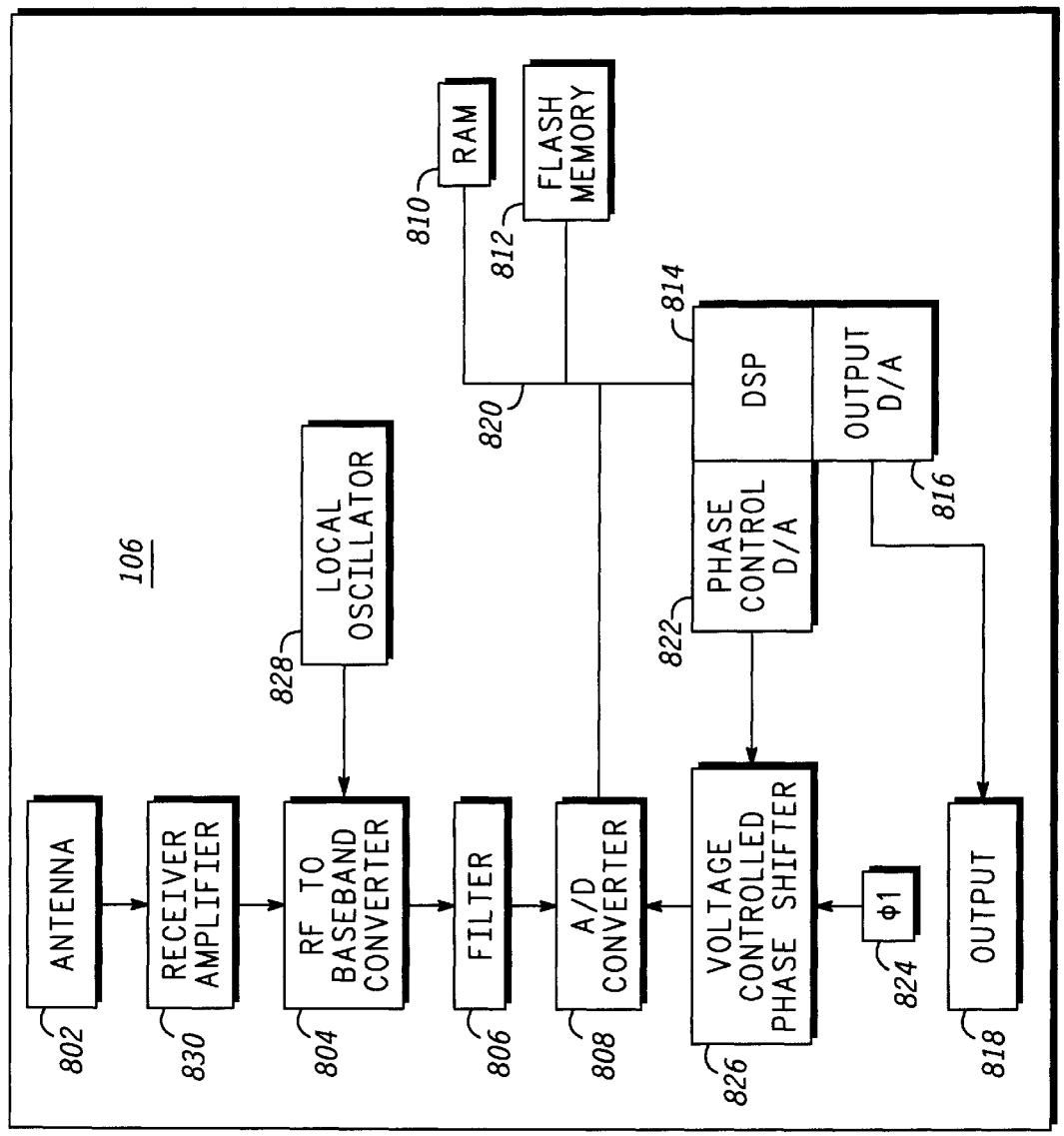
FIG. 8 is a hardware block diagram of a receiver shown in FIG. 1 according to a preferred embodiment of the invention.

FIG. 8 is a hardware block diagram of the first and second receivers 106 (FIG. 1) according to a preferred embodiment of the invention.

An antenna 802 receives the RF signal from the transmitter 104 (FIGS. 1, 2). The antenna 802 is provided with an output coupled to a first input of an amplifier 830. The amplifier boosts the RF signal, and outputs an amplified RF signal at a first output. The first output coupled is coupled to a first input of an RF to baseband converter 804. A local oscillator 828 is provided with an output coupled to a second input of the RF to baseband converter 804. The RF to baseband converter 804 mixes a local oscillator signal received from the local oscillator 828 and the RF signal and outputs the analog version of the DS-CDMA baseband signal 700 (FIG. 7) at an output. The RF to baseband converter 804 also outputs noise, interference resulting from other transmission not intended for the receiver 106, and high frequency components.

An input of a filter 806 is coupled to the output of the RF to baseband converter 804, and receives the DS-CDMA signal along with noise and interference. The filter 806 preferably comprises a low pass filter and consequently removes high frequency components output by the RF to baseband converter 804.

An output of the filter 806 is coupled to an input of a receiver analog to digital converter 808.

A digital signal processor 814 is coupled to an output of the receiver analog to digital converter 808 through a receiver signal bus 820.

A random access memory 810 which is used as a work space for executing programs and a flash memory 812 which constitutes a computer readable medium is also coupled to the bus 820. The flash memory 812 is used to store programs including one described below with reference to a flow chart shown in FIG. 13, which is used to operate the receiver 106 to carry out a method for synchronizing the receiver 106 to a received baseband DS-CDMA signal 700 (FIG. 7) according to a preferred embodiment of the invention. The programs stored in the flash memory 812 are executed by the digital signal processor 814. The flash memory 812 can also be used to store the DS-CDMA code sequence and information related to correlation vectors and/or the correlation vectors themselves as discussed below.

A phase control digital to analog converter 822 is also coupled to the digital signal processor 814 which is also coupled to the bus 820. An output of the phase control digital to analog converter 822 is coupled to a voltage controlled phase shifter 826. A sampling clock 824 is also coupled to the voltage controlled phase shifter 826. A signal produced by the sampling clock 824 can be derived from a master system clock (not shown). The voltage controlled phase shifter 826 shifts the signal produced by the sampling clock 824 in accordance with a binary number representing a sub chip time shift written to an input register of the phase control digital to analog converter 822.

A receiver output digital to analog converter 816, which can be integrated with the digital signal processor 814, is coupled thereto. The output digital to analog converter 816 is used to drive an output 818 based on information encoded in the DS-CDMA baseband signal, which can be audio, video or any other suitable signal in accordance with the preferred embodiments of the invention.

In the case that the receiver 106 is part of a wireless network node, the digital to analog converter 816 can be eliminated, and the output 818 is used to output a binary data sequence.

The transmitter 104 (FIGS. 1, 2) and the receiver 106 can be implemented in whole or in part as one or more Application Specific Integrated Circuits (ASIC).

Figure 9:
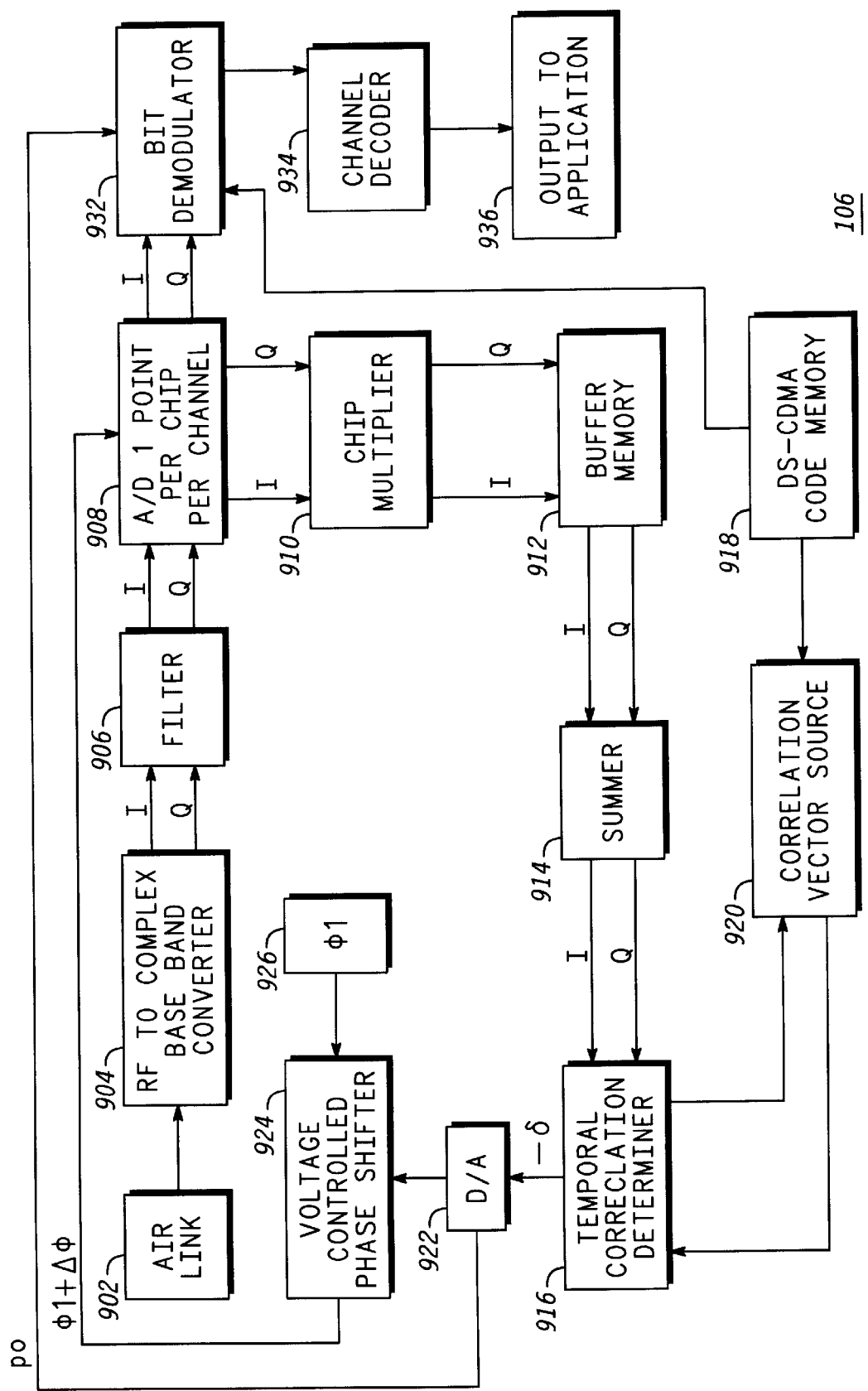
FIG. 9 is a functional block diagram of the receiver shown in FIGS. 1 and 8.

FIG. 9 is a functional block diagram of the receiver 106 according to a preferred embodiment of the invention.

Referring to FIG. 9, an air link 902 which can comprise antenna 802, provides the RF signal as an input.

The air link 902 is coupled to an RF to baseband converter 904. The RF to baseband converter 902 is a complex signal type which outputs an in phase (I) and a quadrature phase (Q) DS-CDMA baseband signals as indicated by I and Q.

The I and Q outputs of the RF to baseband converter 904 are input into a filter 906 which outputs filtered I and Q signals. The filter 906 can be a low pass analog filter. A response function of the filter 906 is preferably tailored to match a digital Finite Impulse Response (FIR) filter which has a time domain representation comprising a set of points with a time domain spread equal to time domain extent of the chip pulse shape function (FIG. 4). More preferably, the filter 906 is tailored to match a FIR filter which has a time domain representation which matches the chip pulse shape function (FIG. 4). The latter is referred to as a chip pulse match filter.

The filtered I and Q signals are input into an analog to digital converter 908.

The analog to digital converter 908 samples the I and Q DS-CDMA baseband signals. The DS-CDMA signals are preferably sampled at a rate of one sample per chip period.

The low sampling rate of one sample per chip is desirable because it reduces the number of processing operations that must be carried out by the receiver, and thereby reduce the drain on a battery (not shown) which powers the receiver. Furthermore it allows for a lower sampling rate, less expensive analog to digital converter 908 to be used. The use of only one sample per chip is enabled because of the high accuracy alignment of the analog to digital converter 908 sample time with a peak in the chip pulse shape function (FIG. 4) that the invention provides.

The analog to digital converter 908 outputs a sequence of chip complex values which are coupled to chip multiplier 910 in separate I and Q input channels. The chip multiplier 910 multiplies each first chip complex value in the sequence by a complex conjugate of another chip complex value in the sequence which is displaced from the first by a fixed number of places. Preferably the fixed number is less than one half of a number of chips per bit, more preferably, each chip is multiplied by the complex conjugate of a chip immediately succeeding it in the sequence. The output of the chip multiplier 910 is a second sequence of complex values referred to hereinafter as a multiplied vector.

Referring again to FIG. 7, a DS-CDMA baseband signal 700 for two successive opposite sign binary data sequence bits is shown. The portion before Tb corresponding to a positive is simply the negative of the portion after TB corresponding to a negative bit.

The operation performed by the chip multiplier has the effect of eliminating most traces of the sign of a bit in the binary data sequence from the chip sequence. For example, consider a positive chip complex value and a negative chip complex value in a particular bit, the product is negative. If the two were inverted (in a chip complex value sequence corresponding to an opposite sign bit) the product would also be negative. On the other hand, consider two same sign chip complex values, their product will be positive regardless of whether they are positive or, in an opposite sign bit, negative. The only residual traces of sign are at bit boundaries where product of two chip complex values separated by the fixed number of places, and separated by a bit boundary will be different in the case of two successive like signed bits, compared to the case of two different sign bits.

An additional effect of the multiplication is to diminish an undesirable modulation of the sequence of the chip complex values at a frequency equal to the difference between the local oscillator and the carrier frequency. By performing the multiplication by complex conjugate operation phase differences involved in this undesirable modulation are subtracted leaving only a smaller difference value in the resulting products in the multiplied vector. It is because the phase difference increase linearly along the chip complex value sequence output by the analog to digital converter 908, that it is preferable to use directly adjacent chip complex values in obtaining the multiplied vector.

Cross correlation operations involving vectors derived from the output of the chip multiplier will be discussed below in more detail. At this juncture it bears noting that if there are a large number of chips in a bit, an error or uncertainty that appears only infrequently at bit boundaries will have a negligible quantitative effect on cross correlation operation s that involve chip complex value vectors equal to a bit or more in length. To mitigate the effect of the boundary uncertainty, preferably at least 15 chips are used per bit, i.e., the DS-CDMA code has at least 15 chip periods, more preferably at least 31 chips are used per bit. For systems in which higher accuracy timing is required more chips per bit can be used.

The chip multiplier 910 is coupled to a buffer memory 912 which receives and stores the multiplied vector of complex values output by the chip multiplier 910. According to a preferred embodiment of the invention successive bit length sequences of chips will be treated as a plurality of separate vectors, and a sum vector will be obtained by summing sets of chip complex values occupying corresponding positions in the plurality of separate vectors. Preferably the multiplied vector will be at least 8 bits in length, more preferably at least 16 bits in length. The plurality of vectors need not be stored as such in memory. For example programming techniques can be used to treat a single sequence as a plurality of vectors. The vectors need not correspond to complete bits, rather they can overlap bits, beginning in the middle of one bit and ending in the middle of another. This is necessary because the proper points of demarcation between bits is not initially known. The methods and apparatus of the invention serve to determine the points of demarcation.

The position of the chip multiplier 910 and the buffer memory 912 in the functional sequence can be transposed. Accordingly a plurality of non multiplied vectors extracted from the sequence output by the analog to digital converter 908 could be stored in the memory 912, and the chip multiplier 910 applied to each vector, before the plurality of vectors are coupled to the summer 914.

The buffer memory 912 is coupled to a summer 914. The summer 914 serves to calculate a sum vector by summing corresponding chip complex values in the plurality of vectors. The summer 914 can be replaced by an averager which averages instead of merely summing. The purpose of summing or averaging in this context is to eliminate noise. The RF signal received by the receiver comprises noise and interference. Each chip complex value in the chip complex value sequence also comprises noise and interference. The noise is random and therefore it can be reduced by averaging of chip complex values in the plurality of vectors.

Preferably, at least eight vectors are averaged or summed, more preferably at least 16 vectors are averaged or summed.

As a result of the chip multiplier 910 processing chip complex values in the plurality of vectors, except at the bit boundaries, have the same value except for a random noise component. Therefore, except at the boundaries, the average will not tend to zero.

According to an alternative preferred embodiment, rather than breaking the multiplied vector into a plurality of bit length vectors and producing a sum vector, the multiplied vector itself, can be used, and the summer 914 can be eliminated. As discussed below the output of the summer will ultimately be used in cross correlation calculation. According to the alternative embodiment, a multiplied vector which is longer than a bit in length, preferably equal to two or more bits in length, is correlated with vector obtained by concatenating more than one copy of a correlation vector. This approach has the effect of averaging out the noise, and is equivalent to breaking up the multiplied vector into smaller vectors and averaging prior to the cross correlation calculation. Both approaches can be equivalent depending on the equivalence of the number, length, and spacing of the vectors involved.

In place of summing or averaging, other noise elimination processes can be used.

The summer 914 is coupled to a temporal correlation determiner. A correlation vector source 920 is also coupled to the temporal correlation determiner 916. According to a preferred embodiment of the invention, the temporal correlation determiner serves to perform cross correlation calculations between the sum vector and a plurality of correlation vectors corresponding to different relative time shifts. A correlation complex value can be obtained from the following cross correlation equation:

$$\frac{|CV \cdot DV|^2}{\|CV\|^2}$$

Where CV is a correlation vector, and DV is the low noise vector (or the multiplied vector)

The equation can be embedded in a program stored in the flash memory 812 (FIG. 8), and executed by digital signal processor 814 (FIG. 8).

The relative time shifts between the correlation vector and the sum vector (or multiplied vector) may be varied on two scales. First the relative time shift can be varied in increments of the chip time. Finding the correct relative time shift on a chip time scale is useful for locating a chip element in the sum vector which corresponds to a correct boundary between bits. This is used in aligning a locally stored copy of the DS-CDMA code in a bit demodulation operation performed by bit demodulator 932.

Second the relative time shift can be varied on a sub chip time scale. The latter is useful in phasing a sampling time of the analog to digital converter 908 so that samples are taken near the peak of each chip pulse shape function thereby increasing a signal to noise ratio.

The temporal correlation determiner 916 determines a correct correlation vector among the plurality of correlation vectors corresponds to the correct relative time shift. The correct correlation vector corresponding to a maximum cross correlation magnitude. In practice determining the correct correlation vector may comprise first optimizing the relative time shift on the chip time scale by varying a first equation parameter po and then further optimizing the relative times shift on the sub chip time scale by varying a second equation parameter δ. The first and second equation parameters can be variables in mathematical expressions of the correlation vectors which are discussed below in further detail.

The value of the first equation parameter, po, which relates to relative time shifts of the plurality of correlation vectors on the chip time scale is coupled from the temporal correlation determiner 916 to a bit demodulator 932 in which it is used to introduce a relative index shift between the DS-CDMA code and a chip sequence derived from the DS-CDMA base band signal.

The second equation parameter δ which relates to relative time shifts of the plurality of correlation vectors on the sub chip time scale is coupled to a digital to analog converter 922. The digital to analog converter 922 outputs a control voltage based on value of the second equation parameter. The control voltage is coupled to a voltage controlled phase shifter 924. The control voltage determines a phase delay applied to a sampling clock signal input to the voltage controlled phase shifter 924 from a sample clock source 926. The sample clock signal is coupled from the voltage controlled phase shifter to the analog to digital converter 908. The sample clock signal controls timing of sampling by the analog to digital converter 908. For example sampling can be triggered at a rising edge of the sample clock signal. The phase delay which is determined by the sub chip time scale relative time shift shifts the sampling time near to the peak in the chip pulse shape function.

The sampling clock 926 may employ a receiver master oscillator signal which is divided down. A desirably inexpensive master oscillator (not shown) can cause undesirable shifts in the analog to digital converter sampling times. However, by using the present invention the phase of the sampling time can be periodically corrected. Moreover, being able to periodically correct a phase of the sampling clock signal without stopping transmission of data makes it practical to use a lower cost lower power consumption analog to digital converter which only takes one sample per chip period.

The analog to digital converter 908 is coupled to the bit demodulator 932. A DS-CDMA code memory 918 is also coupled to the bit demodulator 932. The DS-CDMA code memory 918 is also coupled to the correlation vector source 920. The bit demodulator 932 multiplies successive bit length chip sequences received from the analog to digital converter 908 by the DS-CDMA code stored in the DS-CDMA code memory 918 to obtain bit length sequences of products. The bit length sequences of products are then summed to obtain bit values. The alignment of the DS-CDMA code, i.e. starting points for successive bit length chip sequences, is controlled by the parameter po related to time shifts on the scale (i.e. multiples of the chip time) of the chip time received from the temporal correlation determiner 916.

A binary data sequence output by the bit demodulator 932 is coupled to a channel decoder 934. A channel decoded binary data sequence output by the channel decoder is coupled to an output to an application 936.

The chip multiplier 910, summer 914, temporal correlation determiner 916, bit demodulator 932, correlation vector source 920, and channel decode 934, can be implemented as programs which are stored in the flash memory 812, and run by the digital signal processor 814. The receiver 108 (FIGS. 1, 8, 9) generally operates under the control of the digital signal processor 814 (FIG. 8) running one or more programs.

The receiver amplifier 830 (FIG. 8) is not shown in FIG. 9. The receiver amplifier 830 serves to boost the power of received signals.

FIG. 10 is a graph of a filtered DS-CDMA signal for one of the two channels I and Q output by the filter 906 (FIG. 9), 806 (FIG. 8).

An initial sampling time shift δ is marked on the time axis t. A sequence of chip complex values will be taken at intervals of the chip time Tc measured from the initial sampling time shift (with a slight error caused by an error in the sampling clock). The initial sampling time shift δ is not aligned with a peak of the filtered DS-CDMA signal because a location of the peak is not initially known. The present invention provides methods and apparatus for aligning the sampling time with a peak.

FIG. 11 is a time series which represents a series of samples taken by analog to digital converter 908 (FIG. 9) at intervals of the chip time Tc from the initial sampling time shift. After removing the noise component from the series shown in FIG. 11, it would constitute a signature of the time shift at which it is obtained. As discussed above first the bit sign information is almost completely eliminated from the chip sequence, in order to facilitate a noise reducing operation involving chip complex values from more than a bit length sequence of chip complex values. Correlated interference, on the other hand, is eliminated by a timing algorithm, for example by the, cross correlation calculation discussed below.

Figure 12:
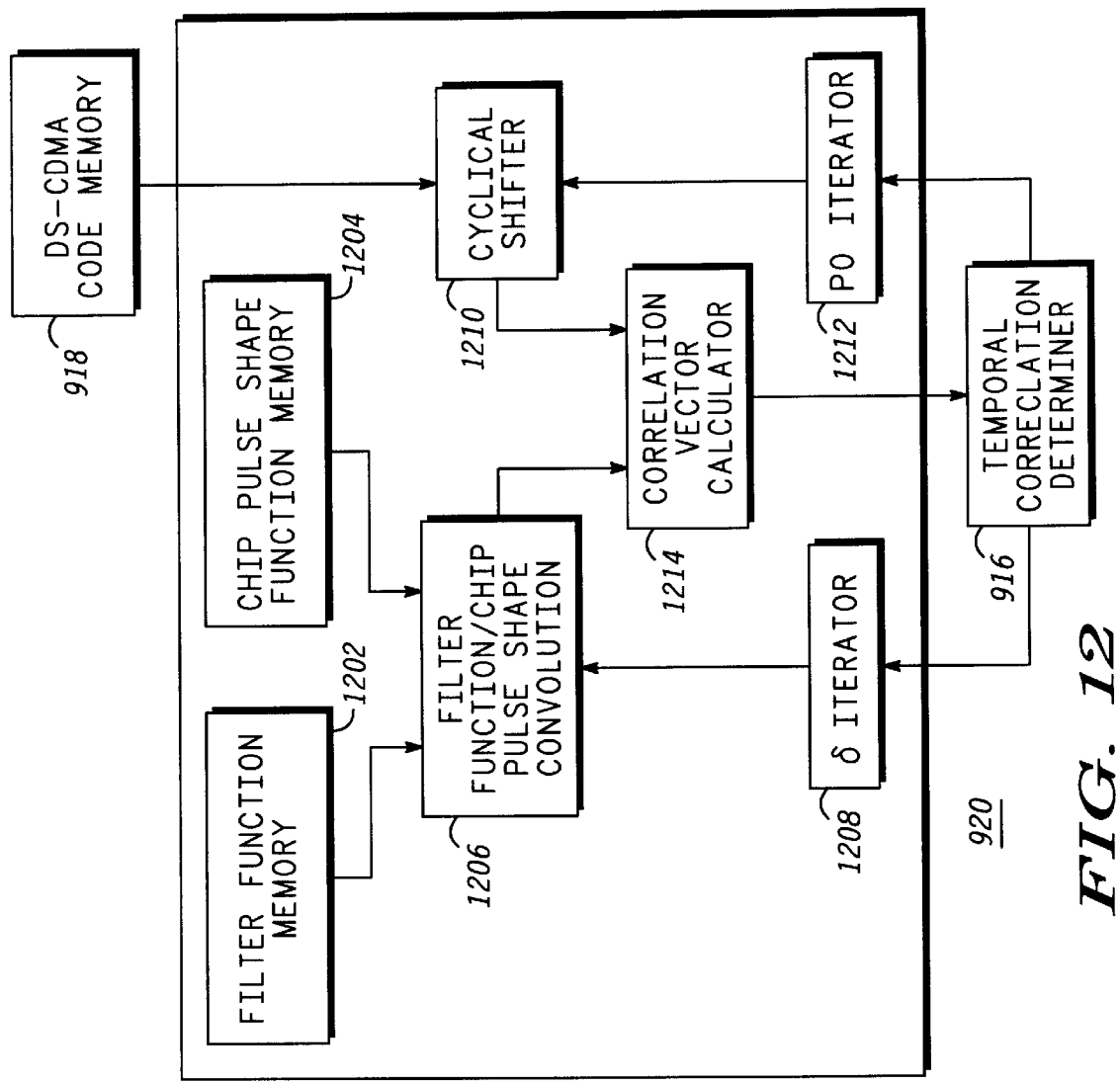
FIG. 12 is a functional block diagram of the correlation vector source shown in FIG. 9.

FIG. 12 is a functional block diagram showing internal design of the correlation vector source 920 (FIG. 9)

A filter function memory 1202 stores a digital filter function. The filter function preferably closely matches a response function of the filter 906 (FIG. 9), 806 (FIG. 8). The filter function is preferably a finite impulse response (FIR) filter which has a time domain representation comprising a set of points with a time domain spread equal to time domain extent of the chip pulse shape function. The filter function also preferably closely matches the chip shape pulse function (FIG. 4)

A chip pulse shape memory 1204 stores a discrete representation of the chip pulse shape function as shown in FIG. 4. The chip pulse shape function can be a half sinusoid function. Other chip pulse shape functions are also useful for DS-CDMA, include but are not limited to: raised cosine, guassian, sinc, hanning, and hamming.

The chip pulse shape function, and the filter function are combined by a filter function chip pulse shape convolution 1206, which obtains values of a1 and a2 by evaluating the following integrals:

$$a1 = \int_0^T Ptc1(t)Ptc2(t-\delta)dt \text{ and,} \quad \{equ1\}$$

$$a2 = \int_0^{2T} Ptc1(t-T)Ptc2(t-\delta)dt \quad \{equ2\}$$

where Ptc2 is the filter function, Ptc1 is the chip pulse shape function, T the integration parameter is preferably between ½ and 2 times the chip period of the DS-CDMA signal, and δ is a time shift less than the chip period. The exact choice of T depends on an extent in a domain of integration of the filter function. Preferably it is between ½ and 2 times the chip period, and more preferably it is about equal to the chip period, and a1 and a2 are terms of the convolution.

An δ iterator 1208 which causes evaluation of a1 and a2 at various values of δ is coupled to the filter function/chip pulse shape convolution 1206.

Ptc2 preferably matches a time domain representation of a filter response function of filter 906. More preferably, the time domain representation of the filter response function of filter 906 preferably matches the DS-CDMA pulse shape function (FIG. 4).

A cyclical shifter 1210 reads the DS-CDMA code from memory 918. The DS-CDMA code can be represented by a vector C=[Co, C1, C2 . . . Cn]. Recall that the parameter po corresponds to time shifts of correlation vectors on the scale of the chip time scale. Accordingly in connection with the cyclical shifter 1210, the parameter po, indicates the number of places by which the DS-CDMA vector is shifted. For example if po=1, the DS-CDMA code vector becomes [Cn, Co, C1, C2, . . . Cn−1].

A po iterator 1212 is coupled to the cyclical shifter 1210.

A correlation vector calculator 1214 is coupled to the cyclical shifter 1210, and to the filter function/chip pulse shape convolution 1206. The correlation vector calculator 1214 evaluates the following expression:

$$CV(po, \delta) = \left([a1, a2]\begin{bmatrix} C(po) \\ C(po+1) \end{bmatrix}\right) \cdot \left([a1, a2]\begin{bmatrix} C(po+I) \\ C(po+1+I) \end{bmatrix}\right) \quad \{equ3\}$$

in which CV(po,δ) is a bit length correlation vector corresponding to a chip scale relative time shift of po times the chip period, and a sub chip time scale relative time shift of δ;

The vector C(argument) corresponds a cyclically shifted version of the DS-CDMA code vector by a number of places specified by the argument; and The variable I which takes on positive or negative integer values, but not zero corresponds to the fixed number of places separating chip complex values which are multiplied together by the chip multiplier 910 (FIG. 9).

The expression is evaluated at a plurality of values of po, and δ to obtain a plurality of correlation vectors.

The correlation vector calculator 1214 is coupled to the temporal correlation determiner 916 (FIG. 9).

Each of the factors in the right hand side of equation 3:

$$CV(po, \delta) = \left([a1, a2]\begin{bmatrix} C(po) \\ C(po+1) \end{bmatrix}\right) \text{ and } [a1, a2]\begin{bmatrix} C(po+I) \\ C(po+1+I) \end{bmatrix}$$

correspond to a filtered and sampled DS-CDMA baseband signal.

Taking the dot product corresponds to multiplying each chip complex value by a chip complex value displaced from it by a fixed number of places.

By way of further explanation, with reference to the multiplication of C(po) and a1 in the first factor, the product corresponds to integrating the convolution of the time domain filter function Ptc2 and the baseband signal over only a first part of a portion of the time domain which the time domain filter function Ptc2 covers. Other products in equation 3 have an analogous interpretation.

The important point is that the correlation vector is obtained by a process that parallels the filtering of the DS-CDMA signal, followed by sampling, and chip complex value multiplication. Therefore, a strong dependence of the correlation complex value on the relative time shift between the correlation vector and the multiplied vector can be expected.

The filter function memory 1202, chip pulse shape memory 1204, and DS-CDMA memory 918 can all be implemented in one physical memory, for example flash memory 812 (FIG. 8). Chip pulse shape memory 1204 and DS-CDMA memory 918 hold information corresponding to that held DS-CDMA code memory (210 FIG. 2), and chip pulse shape memory 208 (FIG. 2) in the transmitter 104 (FIGS. 1, 2).

The filter function/pulse shape convolution 1206, the cyclical shifter 1210, the $\delta$ iterator 1208, and the po iterator 1212 can be implemented as programs stored in flash memory 812, and run by digital signal processor 814.

The plurality of correlation vectors can be extended in length beyond one bit, by concatenating multiple copies of the DS-CDMA code sequence to form a concatenated sequence and using that new sequence in the correlation vector equation {equ3} above. In this case a plurality of correlation vectors obtained from the concatenated sequence can be used in a cross correlation calculation, preferably, based on corresponding length sequences output by the chip multiplier 910. In this case summing by the summer 914, to eliminate noise is not necessary since the summing takes place in the cross correlation.

According to an alternative embodiment of the invention the different relative time shifts can be obtained by shifting a signal representation (e.g., the output of the summer 914 (FIG. 9)) relative to a single correlation vector. The effect is the same.

The correlation vector source 920 can interoperate with the temporal correlation determiner 916 (FIG. 9) in an open loop fashion in which it provides the plurality of correlation vectors corresponding to a plurality of time shifts to the temporal correlation determiner and the temporal correlation determiner 916 (FIG. 9) determines a correct correlation vector.

Alternatively, a maximizing routine can be implemented in the temporal correlation determiner 916 (FIG. 9) according to which it initially requests a few correlation vectors and subsequently requests a sequence of further correlation vectors which are successively closer to the correct correlation vector. Maximizing routines are known and can be found in the literature on algorithms including Press. W.H. *Numerical Recipes*, Cambridge, Cambridge University Press, 1986, 274-. If the maximizing routine is implemented the temporal correlation determiner 916 (FIG. 9) would be linked (e.g., by function call parameters in the case of software implementation) to the $\delta$ iterator 1208, and the po iterator so that it could specify certain correlation vectors to be generated.

The cross correlation calculation will have a low result for a full range of $\delta$, for all but one or two values of po. Therefore it is desirable to do a global search for a value of po that gives a strong signal and then optimize $\delta$.

The correlation vector source 920 (FIG. 9)can pass values of parameters po and $\delta$ to the temporal correlation determiner along with a correlation vector based on those values. Accordingly when the temporal correlation determiner 916 (FIG. 9) determines a correlation vector which yields a maximum correlation complex value it has already received the associated parameter values to supply as output.

Rather than utilizing the filter function memory 1202, and the chip pulse shape function memory 1204, a plurality of values of integrals a1, and a2 can be stored in a look up table data structure in flash memory 812 (FIG. 8). If it is desirable to be able to synchronize the analog to digital converter 908 (FIG. 9) to within 1/10th the chip period of the chip pulse peak, then 10 values for each integral a1, a2 corresponding to $\delta$ increments of 1/10th the chip period should be stored. Preferably values of a1 and a2 will be calculated and/or stored in memory for increments of $\delta$ of 1/128 to 1/3 of the chip period.

Rather than calculating the correlation vectors in the receiver, a set of correlation vectors can be stored in flash memory 812 (FIG. 8).

The correlation vector source (FIG. 9) is not limited to being based on the equations presented above. The correlation vector can also be based on sampling a synthesized signal or based on other mathematical representations. The correlation vector source 920 (FIG. 9) can be implemented differently than according to FIG. 12. What is required of the correlation vector source is that it be capable of outputting representations of a signal at least one and preferably a plurality of relative time shifts.

Figure 13:
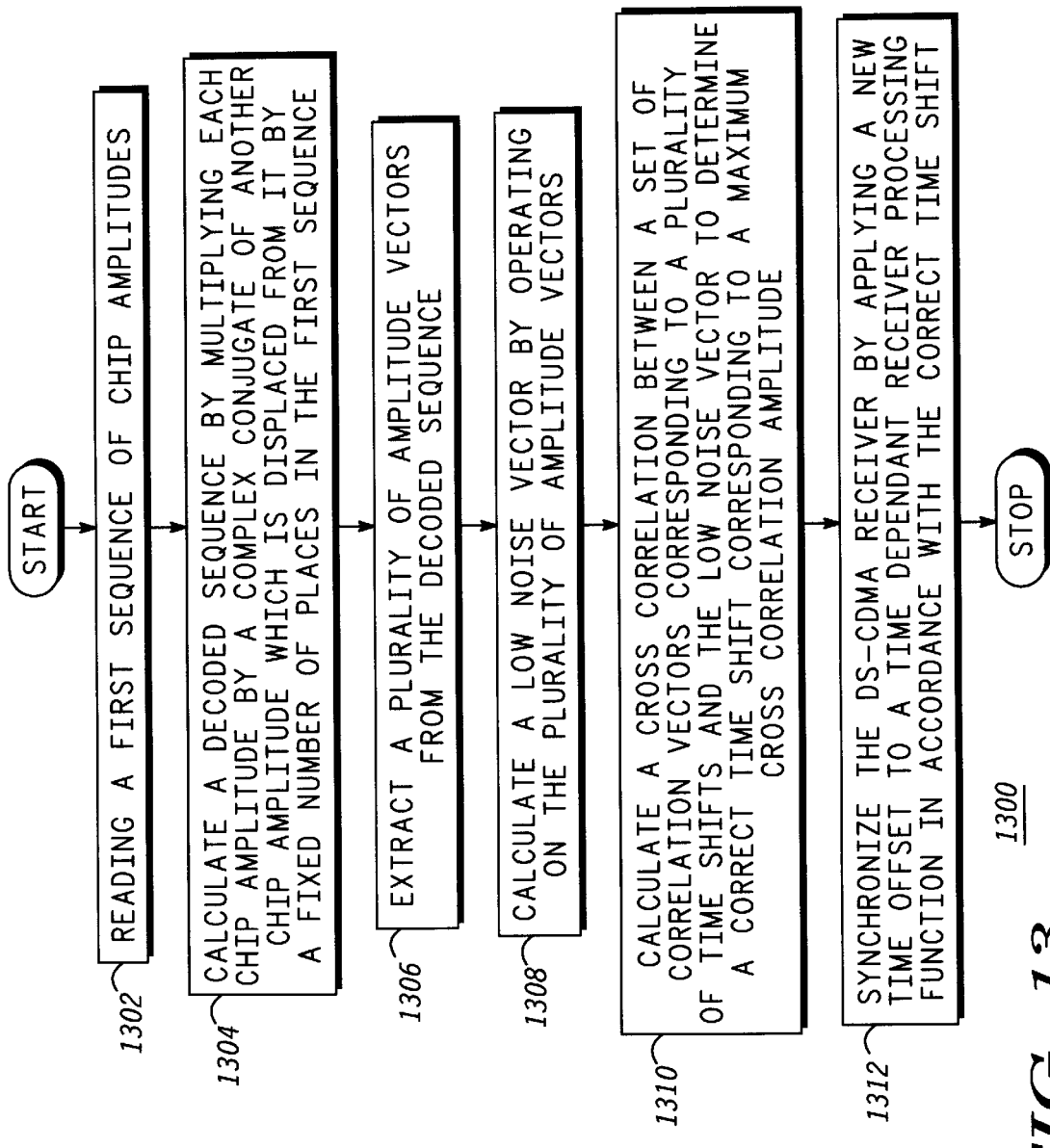
FIG. 13 is a flow diagram of a process performed by the receiver shown in FIGS. 1, 8, and 9 according to a preferred embodiment of the invention.

FIG. 13 is a flow chart of a process 1300 performed by receiver 106 (FIGS. 1, 8, 9) according to a preferred embodiment of the invention. The program can be stored in the flash memory 810, and run by the digital signal processor 814. The process blocks that comprise the process 1300 correspond to one or more functional blocks shown in FIG. 9.

In process block 1302, the filtered signal is sampled to produce a first sequence of chip complex values. This can be done by the analog to digital converter 908 (FIG. 9), 808 (FIG. 8) under the control of the digital signal processor 814 (FIG. 8).

In process block 1304, a multiplied vector is calculated by multiplying each chip complex value by a complex conjugate of another chip pulse which is displaced from it by a fixed number of places in the first sequence.

In process block 1306 a plurality of complex value vectors are extracted from the multiplied vector.

In process block 1308, a low noise vector is calculated by operating on the plurality of complex value vectors. The low noise vector can be calculated by averaging or summing corresponding elements in the plurality of complex value vectors. Corresponding elements are separated from each other by multiples of the number of chips per bit, in the multiplied vector.

In process block 1310, cross correlations between a set of correlation vectors corresponding to a plurality of time shifts and the low noise vector are calculated to determine a correct time shift which corresponding to a maximum cross correlation magnitude.

In process block 1312, the DS-CDMA receiver is synchronized by applying a new time offset to a time dependant receiver processing function in accordance with the correct time shift. This process block 1312 can comprise the following two separate operations: outputting the parameter po to the bit demodulator 932 (FIG. 9), and outputting the $\delta$ to the digital to analog converter 922 (FIG. 9). The successive operations in synchronizing the receiver that follow from those outputs are discussed above.

Thus the invention teaches a method and apparatus for achieving accurate synchronization of a receiver 106 (FIGS. 1, 8, 9) to a DS-CDMA signal which is based on processing an unknown binary data sequence, e.g., actual data being transmitted as opposed to a predetermined training sequence. Therefore a preferred method allows for frequent training and/or training based on a large number of bits without reducing the effective bit rate at which the receiver can receive data. This in turn allows a high precision synchronization to be achieved using a relatively low precision oscillator for the receiver 106 (FIGS. 1, 8, 9).

In a receiver 106 (FIGS. 1, 8, 9) that uses a single signal processing channel, as opposed to I and Q channels, a real valued chip complex value, which is a special case (imaginary part=0) of a complex chip value is used.

The computer readable medium used in connection with the present invention as a memory for storing programs can comprise volatile memory such as RAM, or a medium that contains data in a transient state, such as a communication channel, network circuits, or a wireless communication link, or preferably nonvolatile memory including but not limited to, flash memory, Read Only Memory (ROM), EPROM, EEPROM, disk drive. The computer readable medium used as a work space for signal processing operations, can comprise Random Access Memory (RAM).

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed.

The invention is not limited to any particular computer program or logic or language, or instruction but may be practiced with any such suitable program, logic or language, or instructions as would be known to one of ordinary skill in the art.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of synchronizing a DS-CDMA receiver, the method comprising the step of:
   calculating a multiplied vector by multiplying each of a plurality of chip complex values in a sequence of chip complex values by a complex conjugate of a second chip complex value in the sequence, wherein the sequence of chip complex values has a length greater than a number of chips per bit; and
   calculating an element of a low noise vector by performing a mathematical operation on a set of chip complex values that are separated from each other by multiples of the number of chips per bit.

2. The method according to claim 1, wherein the step of calculating an element of a low noise vector comprises the step of:
   summing a set of chip complex values that are separated from each other by multiples of the number of chips per bit.

3. The method according to claim 1, further comprising the step of:
   sampling a filtered DS-CDMA signal to produce the sequence of chip complex values.

4. The method according to claim 3, further comprising the step of:
   filtering a baseband DS-CDMA signal with a filter having a first filter response function to produced the filtered DS-CDMA signal.

5. The method according to claim 3, further comprising the step of:
   filtering a baseband DS-CDMA signal with a filter characterized by a time domain representation that matches a pulse shape of the base band DS-CDMA signal to produced the filtered DS-CDMA signal.

6. A method of synchronizing a DS-CDMA receiver, the method comprising the step of:
   calculating a multiplied vector by multiplying each first chip complex value of a plurality of chip complex values in a sequence of chip complex values by a complex conjugate of a second chip complex value in the sequence displaced from the first by a predetermined number of places in the sequence, the sequence of chip complex values has a length greater than a number of chips per bit; and
   calculating an element of a low noise vector by performing a mathematical operation on a set of chip complex values that are separated from each other by multiples of the number of chips per bit.

7. The method according to claim 6, wherein the predetermined number of places is less than half of a number of chips per bit.

8. The method according to claim 6, wherein the predetermined number of places is equal to one.

9. The method according to claim 6, wherein the sequence of chip complex values has a length greater than 8 times the number of chips per bit.

10. The method according to claim 6, wherein the sequence of chip complex values has a length greater than 16 times the number of chips per bit.

11. The method according to claim 6, further comprising the steps of:
    sampling a filtered DS-CDMA signal to produce the sequence of chip complex values.

12. The method according to claim 11, further comprising the step of:
    filtering a baseband DS-CDMA signal with a filter having a first filter response function to produce the filtered DS-CDMA signal.

13. The method according to claim 6, further comprising the step of:
    generating one or more correlation vectors of a set of correlation vectors by evaluating the following vector expression:

$$\left( [a1, a2] \begin{bmatrix} C(po) \\ C(po+1) \end{bmatrix} \cdot [a1, a2] \begin{bmatrix} C(po+I) \\ C(po+1+I) \end{bmatrix} \right)$$

C(argument) is a cyclically shifted version a DS-CDMA code sequence used to encode the baseband CDMA signal, which is cyclically shifted by argument number of places;
po is a 0 or integer valued independent variable;
I is the predetermined number of places;
a1 is given by:

$$a1 = \int_0^T Ptc1(t)Ptc2(t-\delta)dt$$

a2 is given by:

$$a2 = \int_T^{2T} Ptc1(t-T)Ptc2(t-\delta)dt$$

where, Ptc1 is a function which characterizes a pulse shape of the DS-CDMA signal;
Ptc2 is the first filter response function;
T is an integration time;
δ is a time shift;

at one or more sets of values of po, and δ.

14. The method of claim 13, further comprising the step of:

calculating a cross correlation between the low noise vector and a first set of correlation vectors corresponding to a plurality of values of po.

15. The method of claim 13, further comprising the step of:

calculating a cross correlation between the low noise vector and a first set of correlation vectors corresponding to a plurality of values of δ.

16. The method according to claim 11, further comprising the step of:

filtering a baseband DS-CDMA signal with a filter characterized by a time domain representation that matches a pulse shape of the base band DS-CDMA signal to produced the filtered DS-CDMA signal.

17. The method according to claim 16, further comprising the step of:

generating one or more correlation vectors of a set of correlation vectors by evaluating the following vector expression:

$$CV(po, \delta) = \left( [a1, a2] \begin{bmatrix} C(po) \\ C(po+1) \end{bmatrix} \right) \cdot \left( [a1, a2] \begin{bmatrix} C(po+I) \\ C(po+1+I) \end{bmatrix} \right) \quad \{equ3\}$$

wherein a vector C(argument) is a cyclically shifted version a DS-CDMA code sequence used to encode the baseband DS-CDMA signal, which is cyclically shifted by argument number of places;
po is a 0 or integer valued independent variable;
I is the predetermined number of places;
a1 is given by:

$$a1 = \int_0^T Ptc1(t)Ptc2(t-\delta)dt$$

a2 is given by:

$$a2 = \int_T^{2T} Ptc1(t-T)Ptc2(t-\delta)dt$$

where, Ptc1 is a function which characterizes a pulse shape of the DS-CDMA signal;
Ptc2 is equal to Ptc1;
T is an integration time;
δ is a time shift;
at one or more sets of values of po, and δ.

18. A method of synchronizing a DS-CDMA receiver, the method comprising the step of:

calculating a multiplied vector by multiplying each first chip complex value of a plurality of chip complex values in a sequence of chip complex values by a complex conjugate of a second chip complex value in the sequence displaced from the first by a predetermined number of places in the sequence, the sequence of chip complex values has a length greater than a number of chips per bit;

calculating an element of a low noise vector by performing a mathematical operation on a set of chip complex values that are separated from each other by multiples of the number of chips per bit; and generating one or more correlation vectors of a set of correlation vectors by evaluating the following vector expression:

$$CV(po, \delta) = \left( [a1, a2] \begin{bmatrix} C(po) \\ C(po+1) \end{bmatrix} \right) \cdot \left( [a1, a2] \begin{bmatrix} C(po+N) \\ C(po+1+N) \end{bmatrix} \right)$$

C(argument) is a cyclically shifted version a DS-CDMA code sequence used to encode the baseband CDMA signal, which is cyclically shifted by argument number of places;
po is a 0 or integer valued independent variable;
is the predetermined number of places;
a1 is given by:

$$a1 = \int_0^T Ptc1(t)Ptc2(t-\delta)dt$$

a2 is given by:

$$a2 = \int_T^{2T} Ptc1(t-T)Ptc2(t-\delta)dt$$

where, Ptc1 is a function which characterizes a pulse shape of the DS-CDMA signal;
Ptc2 is the first filter response function;
T is an integration time;
δ is a time shift;
at one or more sets of values of po, and δ to obtain a plurality of vectors; and
concatenating together a plurality of copies of each of the plurality of vectors.

19. The method according to claim 18, further comprising the step of:

filtering a baseband DS-CDMA signal with a filter characterized by a time domain representation that matches a pulse shape of the base band DS-CDMA signal to produced the filtered DS-CDMA signal.

20. A method of synchronizing a DS-CDMA receiver, the method comprising the step of:

calculating a multiplied vector by multiplying each first chip complex value of a plurality of chip complex values in a sequence of chip complex values by a complex conjugate of a second chip complex value in the sequence displaced from the first by a predetermined number of places in the sequence, the sequence of chip complex values has a length greater than a number of chips per bit;

calculating an element of a low noise vector by performing a mathematical operation on a set of chip complex values that are separated from each other by multiples of the number of chips per bit:

sampling a filtered DS-CDMA signal to produce the sequence of chip complex values;

filtering a baseband DS-CDMA signal with a filter characterized by a time domain representation that matches a pulse shape of the base band DS-CDMA signal to produced the filtered DS-CDMA signal; and generating one or more correlation vectors of a set of correlation vectors by evaluating the following vector expression:

$$CV(po, \delta) = \left( [a1, a2] \begin{bmatrix} C(po) \\ C(po+1) \end{bmatrix} \cdot [a1, a2] \begin{bmatrix} C(po+I) \\ C(po+1+I) \end{bmatrix} \right) \quad \{equ3\}$$

wherein a vector C(argument) is a cyclically shifted version a DS-CDMA code sequence used to encode the baseband CDMA signal, which is cyclically shifted by argument number of places;
po is a 0 or integer valued independent variable;
I is the predetermined number of places;
a1 is given by:

$$a1 = \int_0^T Ptc1(t)Ptc2(t-\delta)dt$$

a2 is given by:

$$a2 = \int_T^{2T} Ptc1(t-T)Ptc2(t-\delta)dt;$$

where, Ptc1 is a function which characterizes a pulse shape of the DS-CDMA signal;
Ptc2 is equal to Ptc1;
T is an integration time;
δ is a time shift;
at one or more sets of values of po, and δ to obtain a plurality of vectors.

21. A DS-CDMA receiver comprising:
a chip multiplier for multiplying each chip complex value in a chip complex value sequence by another chip complex value in the chip complex value sequence which is displaced from it by a predetermined number of places to produce a multiplied vector, DV;
a correlation vector source for providing a correlation vector corresponding to a time shift; and
a temporal correlation determiner for processing the multiplied vector and the correlation vector to deduce information about a relative shift between the multiplied vector and the correlation vector.

22. The DS-CDMA receiver according to claim 21, wherein:
the correlation vector source comprises:
a memory for storing the correlation vector.

23. The DS-CDMA receiver according to claim 21, wherein:
the correlation vector source comprises:
a processor for computing the correlation vector.

24. The DS-CDMA receiver according to claim 21, wherein:
the chip multiplier, the correlation vector source, and the temporal correlation vector are implemented as one or more programs stored in a memory and executed by a programmable digital signal processor.

25. The DS-CDMA receiver according to claim 21, further comprising:
an RF to baseband converter for demodulating a received RF DS-CDMA signal and outputting a baseband DS-CDMA signal; and
a filter for filtering the baseband DS-CDMA signal to produces a filtered DS-CDMA signal.

26. The DS-CDMA receiver according to claim 21, wherein:
the correlation vector source comprises a processor for evaluating a vector expression given by:

$$CV(po, \delta) = \left( [a1, a2] \begin{bmatrix} C(po) \\ C(po+1) \end{bmatrix} \cdot [a1, a2] \begin{bmatrix} C(po+I) \\ C(po+1+I) \end{bmatrix} \right)$$

where CV is a correlation vector which depends of po and δ;
C(X) is a cyclically shifted version a DS-CDMA code sequence used to encode
the baseband CDMA signal, which is cyclically shifted by X places;
po is a 0 or integer valued independent variable
I is the predetermined number of places;
a1 is an integral given by:

$$a1 = \int_0^T Ptc1(t)Ptc2(t-\delta)dt;$$

a2 is an integral given by:

$$a2 = \int_0^{2T} Ptc1(t-T)Ptc2(t-\delta)dt$$

where, Ptc1 is a function which characterizes a pulse shape of the DS-CDMA signal;
where, Ptc2 is a function which characterizes the filter;
T is between 2 and 2 times a chip period of the DS-CDMA signal; and
δ is a time shift less than the chip period;
at one or more sets of values of po, and δ.

27. The DS-CDMA receiver according to claim 26, wherein:
the correlation vector source comprises a memory for storing a plurality of values of the integral:

$$a1 = \int_0^T Ptc1(t)Ptc2(t-\delta)dt$$

evaluated at a plurality of values of δ.

28. The DS-CDMA receiver according to claim 26, wherein:
Ptc1 is substantially equal to Ptc2.

29. The DS-CDMA receiver according to claim 26, wherein the temporal correlation determiner comprises a process for evaluating the vector expression:

$$\frac{|CV \cdot DV|^2}{\|CV\|^2}$$

at a plurality of values of po.

30. The DS-CDMA receiver according to claim 26, wherein the temporal correlation determiner comprises a process for evaluation the vector expression:

$$\frac{|CV \cdot DV|^2}{\|CV\|^2}$$

at a plurality of values of δ.

31. The DS-CDMA receiver according to claim 25, wherein the temporal correlation determiner comprises:
a processor for taking a dot product of the multiplied vector and the correlation vector.

32. A communication system comprising:

a transmitter including:
  a modulator for modulating a carrier signal with a baseband DS-CDMA signal to produce an RF DS-CDMA signal; and
a receiver comprising:
  an RF to baseband converter for demodulating the RF DS-CDMA and outputting a baseband CDMA signal;
  a filter for filtering the baseband DS-CDMA signal to produces a filtered DS-CDMA signal;
  an analog to digital converter for sampling the filtered DS-CDMA signal to produce a first chip complex value sequence;
  a chip multiplier for multiplying each chip complex value in the chip complex value sequence by another chip complex value in the chip complex value sequence which is displaced from it by a predetermined number of places to produce a multiplied vector;
  a correlation vector source for providing a correlation vector corresponding to a time shift; and
  a temporal correlation determiner for processing the multiplied vector chip vector and the correlation vector to deduce information about a relative shift between them.

33. The communication system comprising according to claim 32, wherein:
  the correlation vector source comprises:
    a memory for storing the correlation vector.

34. The communication system according to claim 32, wherein:
  the correlation vector source comprises:
    a processor for computing the correlation vector.

35. The communication system according to claim 32, wherein:
  the chip multiplier, the correlation vector source, and the temporal correlation determiner are implemented as one or more programs stored in a memory and executed by a digital signal processor.

36. The communication system according to claim 32, wherein:
  the correlation vector source comprises a processor for evaluating a vector expression given by:

$$CV(po, \delta) = \left( [a1, a2] \begin{bmatrix} C(po) \\ C(po+1) \end{bmatrix} \cdot [a1, a2] \begin{bmatrix} C(po+l) \\ C(po+1+l) \end{bmatrix} \right)$$

where CV is a correlation vector which depends of po and $\delta$;
  C(X) is a cyclically shifted version a DS-CDMA code sequence used to encode the baseband CDMA signal, which is cyclically shifted by X places;
  po is a 0 or integer valued independent variable;
  l is the predetermined number of places;
  a1 is an integral given by:

$$a1 = \int_0^T Ptc1(t)Ptc2(t-\delta)\,dt$$

a2 is an integral given by:

$$a2 = \int_0^{2T} Ptc1(t-T)Ptc2(t-\delta)\,dt$$

where, Ptc1 is a function which characterizes a pulse shape of the DS-CDMA signal;
  where, Ptc2 is a function which characterizes the filter, T is between 2 and 2 times a chip period of the DS-CDMA signal; and
  $\delta$ is a time shift less than the chip period;
  at one or more sets of values of po, and $\delta$.

37. The communication system according to claim 36, wherein the temporal correlation determiner comprises:
  a processor for taking a dot product of the multiplied vector and the correlation vector.

38. The communication system according to claim 36, wherein:
  the correlation vector source comprises a memory for storing a plurality of values of the integral:

$$a1 = \int_0^T Ptc1(t)Ptc2(t-\delta)\,dt$$

evaluated at a plurality of values of $\delta$.

39. The communication system of claim 32, wherein the modulator comprises:
  a modulator for modulating a carrier signal with a baseband DS-CDMA signal, based on a DS-CDMA code of at least 15 chips.

40. The communication system of claim 32, wherein the modulator comprises:
  a modulator for modulating a carrier signal with a baseband DS-CDMA signal, based on a DS-CDMA code of at least 31 chips.

41. The communication system according to claim 40, wherein the temporal correlation determiner comprises a processor for evaluation a vector expression:

$$\frac{|CV \cdot DV|^2}{\|CV\|^2}$$

where DV is the multiplied vector,
  at a plurality of values of po.

42. The communication system according to claim 40, wherein the temporal correlation determiner comprises a processor for evaluation the vector expression:

$$\frac{|CV \cdot DV|^2}{\|CV\|^2}$$

where DV is the multiplied vector,
  at a plurality of values of $\delta$.

43. A computer readable medium containing programming instructions for synchronizing a DS-CDMA receiver, comprising programming instruction for:
  sampling a filtered baseband DS-CDMA signal to produce a first sequence of chip complex values;
  calculating a multiplied vector by multiplying each chip complex value by a complex conjugate of another chip pulse which is displaced from it by a predetermined number of places in the first sequence;

extracting a plurality of complex value vectors from the multiplied vector;

calculating a low noise vector by operating on the plurality of complex value vectors;

calculating a cross correlation between a set of correlation vectors corresponding to a plurality of time shifts and the low noise vector to determine a correct time shift corresponding to a maximum cross correlation magnitude; and synchronizing the DS-CDMA receiver by a applying a new time offset to a time dependant receiver processing function in accordance with the correct time shift.

44. The computer readable medium according to claim 43, further comprising programming instructions for:

generating one or more correlation vectors of the set of correlation vectors (CV) by evaluating the following vector expression:

$$CV(po, \delta) = \left( [a1, a2] \begin{bmatrix} C(po) \\ C(po+1) \end{bmatrix} \right) \cdot [a1, a2] \begin{bmatrix} C(po+I) \\ C(po+1+I) \end{bmatrix}$$

where CV is a correlation vector which depends of po and $\delta$;

C(argument) is a cyclically shifted version a DS-CDMA code sequence used to encode the baseband CDMA signal, which is cyclically shifted by argument places;

po is 0 or an integer;

I is the predetermined number of places;

a1 is given by:

$$a1 = \int_0^T Ptc1(t)Ptc2(t-\delta)dt$$

a2 is given by:

$$a2 = \int_0^{2T} Ptc1(t-T)Ptc2(t-\delta)dt$$

where, Ptc1 is a function which characterizes a pulse shape of the DS-CDMA signal;

Ptc2 is a function which characterizes the filter;

T is between 2 and 2 times a chip period of the DS-CDMA signal;

$\delta$ is a time shift less than the chip period;

at one or more sets of values of po, and $\delta$.

45. The computer readable medium according to claim 44, wherein the programming instructions for calculating a cross correlation comprises programming instructions for:

calculating a cross correlation between the low noise vector and a first set of correlation vectors corresponding to a plurality of values of po.

46. The computer readable medium according to claim 44, wherein the programming instructions for calculating a cross correlation comprises programming instructions for:

calculating a cross correlation between the low noise vector and a first set of correlation vectors corresponding to a plurality of values of $\delta$.

47. The computer readable medium according of claim 44, further comprising programming instructions for:

storing a set of correlation vectors corresponding to a plurality of time shifts in a memory in the receiver.

48. The computer readable medium according to of claim 44, wherein the predetermined number of places is one.

49. The computer readable medium according to claim 44, wherein the programming instructions for calculating a cross correlation comprises programming instructions for:

calculating a cross correlation between the low noise vector and a first set of correlation vectors corresponding to a plurality of values of $\delta$.

50. The computer readable medium of claim 43, wherein the programming instructions for sampling the filtered signal comprises programming instructions for:

sampling the filtered signal at frequency nominally equal to a chip rate associated with the baseband DS-CDMA signal to produce a sequence of chip complex values.

51. The computer readable medium of claim 43, wherein the programming instructions for extracting a plurality of complex value vectors from the multiplied vector comprises programming instruction for:

extracting a plurality of successive bit length bit length vectors form the multiplied vector.

52. The computer readable medium according to claim 43, wherein the programming instructions for sampling the filtered signal comprises programming instructions for:

sampling I an Q channels of the filtered signal to produce a sequence of chip complex values.

* * * * *